(12) United States Patent
Schroeder

(10) Patent No.: US 11,167,315 B2
(45) Date of Patent: Nov. 9, 2021

(54) UNIVERSAL BELTED CHAIN

(71) Applicant: WCCO Belting, Inc., Wahpeton, ND (US)

(72) Inventor: Michael B. Schroeder, Wahpeton, ND (US)

(73) Assignee: WCCO Belting, Inc., Wahpeton, ND (US)

( * ) Notice: Subject to any disclaimer, the term of this patent is extended or adjusted under 35 U.S.C. 154(b) by 175 days.

(21) Appl. No.: 16/592,091

(22) Filed: Oct. 3, 2019

(65) Prior Publication Data
US 2020/0122198 A1   Apr. 23, 2020

Related U.S. Application Data

(60) Provisional application No. 62/746,722, filed on Oct. 17, 2018.

(51) Int. Cl.
| | |
|---|---|
| *B65G 15/30* | (2006.01) |
| *B07B 1/10* | (2006.01) |
| *B07B 1/12* | (2006.01) |
| *A01D 75/00* | (2006.01) |

(Continued)

(52) U.S. Cl.
CPC .................. *B07B 1/10* (2013.01); *B07B 1/12* (2013.01); *B65G 15/30* (2013.01); *A01D 17/10* (2013.01); *A01D 33/08* (2013.01); *A01D 75/00* (2013.01); *A01D 2017/103* (2013.01)

(58) Field of Classification Search
CPC ...... B65G 15/30; B65G 15/52; B65G 17/063; B65G 17/42; A01D 33/08; A01D 75/00; A01D 2017/103; A01D 17/10; B07B 1/10; B07B 1/12; B07B 1/4636
See application file for complete search history.

(56) References Cited

U.S. PATENT DOCUMENTS

| | | |
|---|---|---|
| 4,724,909 A | 2/1988 | Link |
| 5,099,548 A | 3/1992 | Loosli |
| (Continued) | | |

OTHER PUBLICATIONS

International Search Report and Written Opinion for PCT Serial No. PCT/US2019/054464, dated Dec. 27, 2019, 10 pgs.

(Continued)

*Primary Examiner* — Joseph C Rodriguez
(74) *Attorney, Agent, or Firm* — Michael A. Bondi; Moss & Barnett

(57) ABSTRACT

Universal belted chain including a first belt, a second belt, a first rod, a first fastener and a second fastener. The first belt has a first upper surface and a first lower surface. The first lower surface has a first channel formed therein. The second belt has a second upper surface and a second lower surface. The second lower surface has a second channel formed therein. The first fastener attaches the first rod to the first upper surface by extending the first fastener through the first belt. An end of the first fastener opposite the first rod is recessed in the first channel with respect to the first lower surface. The second fastener attaches the first rod to the second upper surface by extending the second fastener through the second belt. An end of the second fastener opposite the first rod is recessed in the second channel with respect to the second lower surface.

20 Claims, 2 Drawing Sheets

(51) Int. Cl.
  *A01D 17/10* (2006.01)
  *A01D 33/08* (2006.01)

(56) References Cited

U.S. PATENT DOCUMENTS

| | | | | |
|---|---|---|---|---|
| 5,176,248 A | * | 1/1993 | Allen | A01D 17/10 171/126 |
| 5,478,277 A | * | 12/1995 | Kloefkorn | A01D 61/008 460/20 |
| 5,671,839 A | | 9/1997 | Sanderson | |
| 6,106,391 A | * | 8/2000 | Tjabringa | A01D 17/10 198/848 |
| 7,182,202 B2 | * | 2/2007 | Kalverkamp | B65G 17/02 198/844.1 |
| 9,033,138 B2 | * | 5/2015 | Mulder | B65G 15/52 198/848 |
| 9,033,139 B2 | * | 5/2015 | Jager | B65G 17/42 198/850 |
| 9,656,809 B1 | * | 5/2017 | Bradshaw | B65G 15/52 |
| 9,856,086 B2 | * | 1/2018 | Oord | B65G 17/12 |
| 10,244,682 B2 | * | 4/2019 | Hulsmann | A01F 15/18 |
| 10,455,766 B2 | * | 10/2019 | Linde | B65G 19/22 |
| 10,850,924 B1 | * | 12/2020 | Jager | B65G 17/063 |
| 2009/0057208 A1 | * | 3/2009 | Pellenc | A23N 15/02 209/606 |
| 2014/0367230 A1 | | 12/2014 | Jager et al. | |
| 2018/0223951 A1 | | 8/2018 | Schroeder et al. | |
| 2020/0245547 A1 | * | 8/2020 | Landsberg | A01D 17/10 |
| 2020/0407167 A1 | * | 12/2020 | Hornick | B23K 26/38 |

OTHER PUBLICATIONS

International Preliminary Report on Patentability received for PCT Serial No. PCT/US2018/054464 dated Apr. 29, 2021, 8 pgs.

* cited by examiner

UNIVERSAL BELTED CHAIN

REFERENCE TO RELATED APPLICATION

This application claims priority to Provisional Applic. No. 62/746,722, filed on Oct. 17, 2018, the contents of which are incorporated herein by reference.

FIELD OF THE INVENTION

The invention relates generally to conveyor belts. More particularly, the invention relates to universal belted chain.

BACKGROUND OF THE INVENTION

Belted chains are used in various types of harvesting equipment for products such as almonds, nuts, carrots, tomatoes, potatoes, beets and onions to convey product from one location to another. For example, on potato harvesters belted chains are used to lift and convey potatoes from where they are removed from the ground to a truck or trailer. Belted chains are also known as belt webbing, traction belting and sieve belting.

The belted chain is an endless assembly in which elongated rods are secured at opposite ends thereof to belts that are driven by pulleys. The rods are typically parallel to each other and spaced apart from each other. The rods are typically oriented generally transverse to the direction of travel of the chain. A benefit of the belted chain is that it allows the product being harvested to be separated from other undesired objects such as dirt that falls through between the elongated rods.

A significant drawback of the prior art belted chain is that a separate set of belts needs to be fabricated for each desired spacing between adjacent rods because the pitch location is skived into the belt so that the rivet plates are recessed in the lower surface of the belts.

SUMMARY OF THE INVENTION

An embodiment of the invention is directed to universal belted chain that includes a first belt, a second belt, a first rod, a first fastener and a second fastener. The first belt has a first upper surface and a first lower surface. The first lower surface has a first channel formed therein. The second belt has a second upper surface and a second lower surface. The second lower surface has a second channel formed therein. The first fastener attaches the first rod to the first upper surface by extending the first fastener through the first belt. An end of the first fastener opposite the first rod is recessed in the first channel with respect to the first lower surface. A second fastener attaches the first rod to the second upper surface by extending the second fastener through the second belt. An end of the second fastener opposite the first rod is recessed in the second channel with respect to second the lower surface.

Another embodiment of the invention is directed to universal belted chain that includes a first belt, a second belt, a first rod, a second rod, a first fastener, a second fastener, a third fastener and a fourth fastener. The first belt has a first upper surface and a first lower surface. The first lower surface has a first channel formed therein. The first belt has a plurality of first apertures formed therein that each intersect the first channel. The second belt has a second upper surface and a second lower surface. The second lower surface has a second channel formed therein. The second belt has a plurality of second apertures formed therein that each intersect the second channel. The first fastener attaches the first rod to the first upper surface by extending the first fastener through the first belt. An end of the first fastener opposite the first rod is recessed in the first channel with respect to the first lower surface. The second fastener attaches the first rod to the second upper surface by extending the second fastener through the second belt. An end of the second fastener opposite the first rod is recessed in the second channel with respect to the second lower surface. The third fastener attaches the second rod to the first upper surface by extending the third fastener through the first belt. An end of the third fastener opposite the second rod is recessed in the first channel with respect to the first lower surface. The fourth fastener attaches the second rod to the second upper surface by extending the fourth fastener through the second belt. An end of the fourth fastener opposite the second rod is recessed in the second channel with respect to the second lower surface. There is a first spacing between the first rod and the second rod.

Another embodiment of the invention is directed to a method of forming universal belted chain. A first belt is provided having a first upper surface and a first lower surface. The first lower surface has a first channel formed therein. A second belt is provided having a second upper surface and a second lower surface. The second lower surface has a second channel formed therein. A first rod is attached to the upper surface of the first belt by extending a first fastener through the first belt. An end of the first fastener opposite the first rod is recessed in the first channel with respect to the first lower surface. The first rod is attached to the upper surface of the second belt by extending a second fastener through the second belt. An end of the second fastener opposite the first rod is recessed in the second channel with respect to the second lower surface.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION OF THE INVENTION

Figure 1:
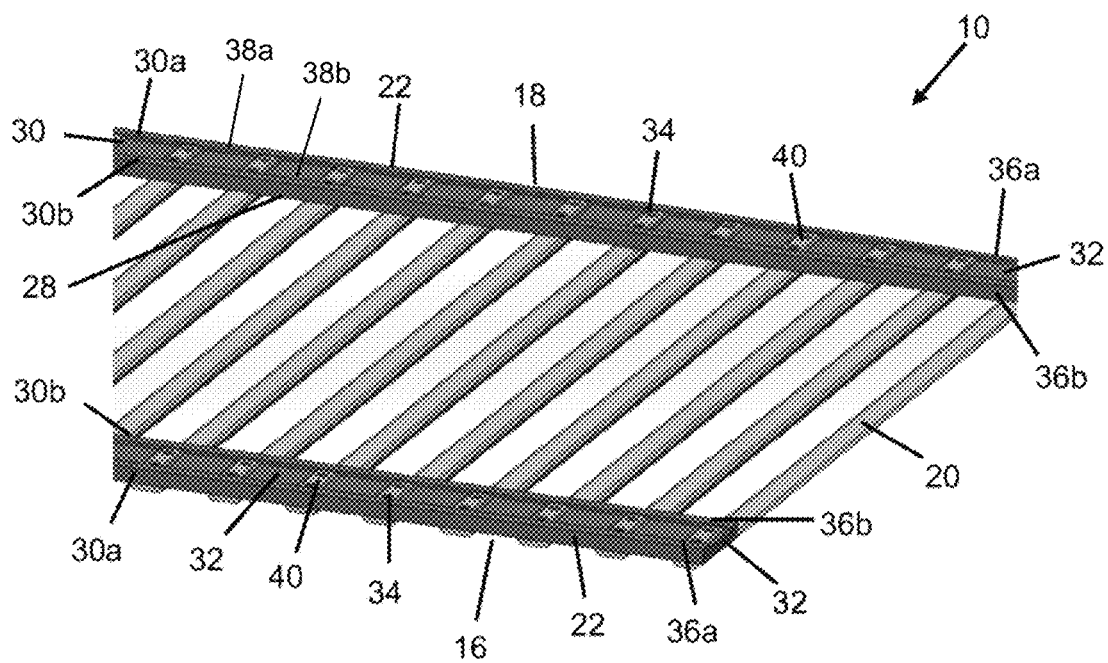
FIG. 1 is a bottom perspective view of universal belted chain according to an embodiment of the invention.
Figure 2:
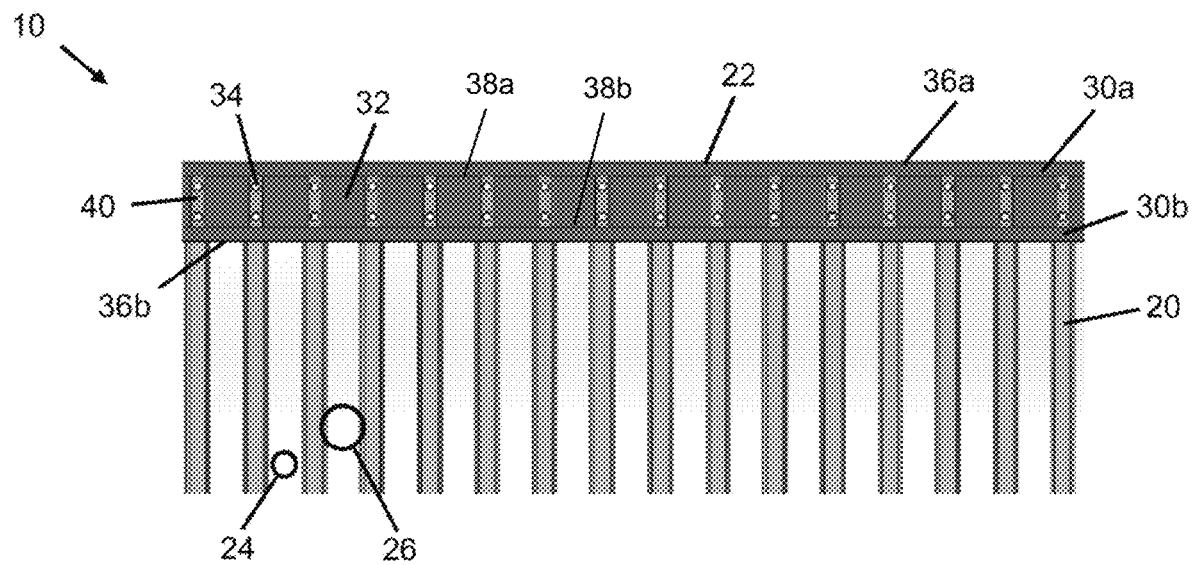
FIG. 2 is a bottom view of one edge of the universal belted chain.
Figure 3:
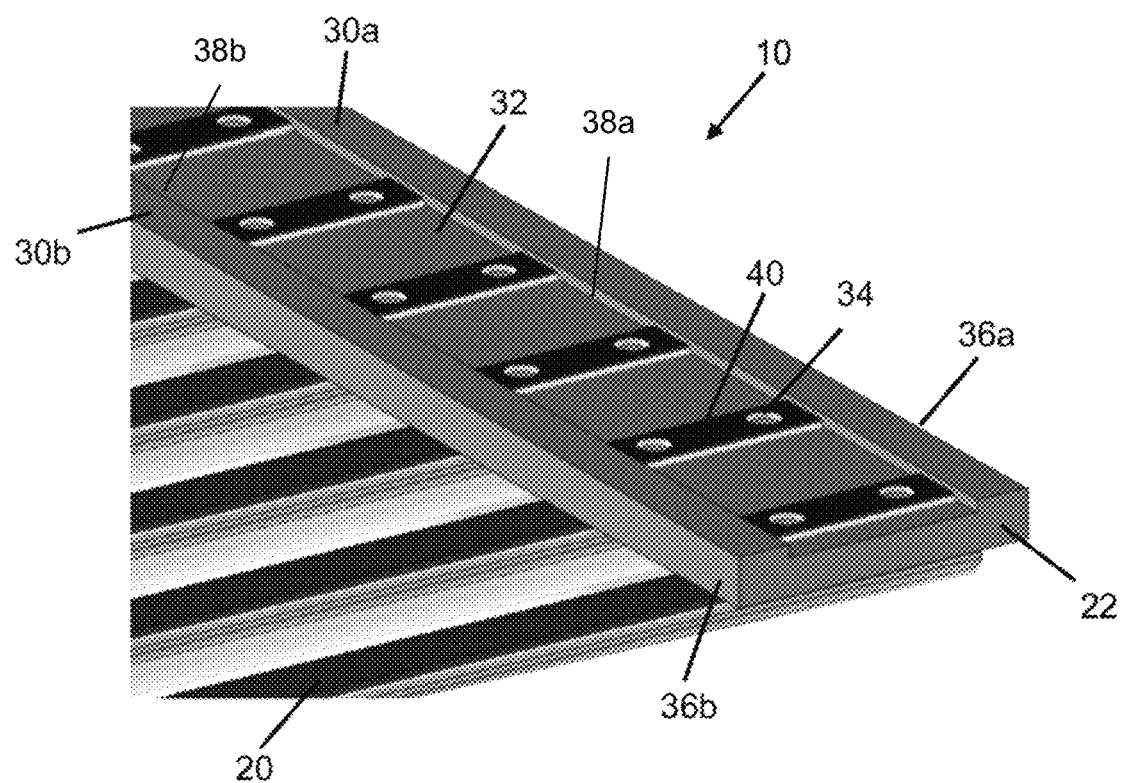
FIG. 3 is an enlarged bottom perspective view of one edge of the universal belted chain.

An embodiment of the invention is directed to universal belted chain as illustrated at 10 in FIGS. 1-3. The universal belted chain 10 includes rods 20 that are mounted in a spaced-apart relationship to belts 22.

The universal belted chain 10 enables the rods 20 to be placed at different spacings to accommodate differently sized objects that are desired to be moved on the universal belted chain 10 by preventing the objects from falling between adjacent rods 20. The universal belted chain 10 enables reconfiguration to change the size at which smaller sized objects 24 are permitted to fall through the universal belted chain 10 from the larger sized objects 26 that are retained on the universal belted chain 10.

The smaller sized objects 24 have a maximum size that is less than a spacing between adjacent rods 20 and the larger size objects 26 has a maximum size that is greater than the spacing between adjacent rods 20, as illustrated in FIG. 2. While the smaller sized objects 24 and the larger sized objects 26 are both illustrated as being round, it is possible for the smaller sized objects 24 and the larger sized objects 26 to have alternative shapes.

During use, the universal belted chain 10 is intended to be oriented with an upper surface 16 thereof directly upwardly so that the objects can be placed thereon to move the objects using the universal belted chain 10. Despite the intended use orientation, the figures illustrate a lower surface 18 of the universal belted chain 10 being oriented upwardly to facilitate visualizing the unique features of the universal belted chain 10.

The rods 20 can assume a variety of configurations using embodiments of the invention. In certain embodiments, the rods 20 have a generally rectangular or circular profile where an upper surface thereof is proximate an upper surface 28 of the belts 22. In other embodiments, the rods 20 may have a rectangular or trapezoidal profile where a portion of the rod 20 extends a distance above the upper surface 28 of the belts 22 to function similar to a cleat on a conventional conveyor belt. Such a configuration may enhance the amount of material that can be moved on the universal belted chain 10.

In many instances, the rods 20 are fabricated from a metallic material. However, a person of skill in the art will appreciated that the rods 20 may be fabricated from a variety of other materials such as plastic or wood.

One of the belts 22 is attached to opposite ends of the rods 20 to retain the rods 20 in a desired spacing and enable the rods 20 to be moved to convey product placed on the universal belted chain 10.

The belts 22 should resist degradation such as from movement over the support structure as well as from the objects that are conveyed on the universal belted chain 10. The belts 22 may have a variety of configurations. In one embodiment, the belts 22 have a fabric base that is coated with rubber. A person of skill in the art will appreciate that alternative techniques may be used to fabricate the belts 22.

Each of the belts 22 is formed with a width and a height. While it is illustrated that the two belts 22 have a similar width and height, it is possible for the belts to have a different width and/or height.

A factor in selecting the width and height of the belts 22 is that the belts 22 have sufficient structural integrity to reduce the potential of the belts 22 experiencing mechanical failure and/or stretching during use. Another factor in selecting the width and height of the belts 22 is to facilitate flexing of the belts 22 when moving around rollers (not shown) at opposite ends of the universal belted chain 10.

A lower surface 30 of the belt 22 has at least one channel 32 formed therein. In certain embodiments, there is one channel 32 formed in each of the belts 22. The channel 32 has a depth and a width that are sufficiently large so that a fastener 34 that is used to attach the rod 20 to the belt 22 is recessed in the channel 32. As used herein, recessed means that no portion of the fastener 34 extends beyond the lower surface 30 of the belt 22.

This configuration avoids contact between the fastener 34 and the support structure as the universal belted chain 10 is moved over the support structure, which avoids degradation of the fastener 34 caused by contact of the fastener 34 with the support structure as the universal belted chain 10 moves over the support structure.

In certain embodiments, the channel 32 is formed intermediate side edges 36a, 36b of the belt 22. With such a configuration, there is a first lower surface portion 30a and a second lower surface portion 30b along opposite side edges 38a, 38b of the channel 32.

While it is illustrated that the channel 32 is approximately equidistant between the side edges 36a, 36b, it is possible for the channel 32 to have different positions on the belt 22. For example, the channel 32 may be closer to one of the side edges 36a, 36b. In other embodiments, the channel 32 is at one of the side edges 36a, 36b. In still other embodiments, there is more than one channel 32. For example, a first channel may be at the first edge 36a and a second channel may be at the second edge 36b. This configuration would provide a lower surface intermediate the channels.

In certain embodiments, each rod 20 is attached to the belt 22 with more than one fastener 34. Factors that impact the number of fasteners 34 used to attach the rod 20 to the belt 22 include the width of the universal belted chain 10 and the weight of the objects being moved on the universal belted chain 10. In other embodiments, two fasteners 34 attach each end of the rod 20 to the belts 22 at opposite ends thereof.

A mounting plate 40 may be provided proximate where the fasteners 34 extend through the belt 22. The mounting plate 40 has an aperture (not shown) formed therein where the fastener 34 extends therethrough. The mounting plate 40 spreads forces over a greater area to reduce the potential of the rod 20 detaching from the belt 22.

The mounting plate 40 may have a length that is approximately the same as a width of the channel 32. Such a configuration reduces the potential of the mounting plate 40 moving laterally while the universal belted chain 10 is being used, which thereby reduces the potential of the holes in the belt 22 being stretched as such stretching could lead to premature failure of the belt 22.

The mounting plate 40 may have a width that is at least twice as wide as the fastener 34. Using such a configuration reduces the potential of the mounting plate 40 being deformed during the use of the universal belted chain 10.

When the mounting plate 40 is used, the channel 32 has a depth that is sufficiently large such that no portion of the mounting plate 40 and the fastener 34, which extends through the mounting plate 40, is recessed in the channel 32 as illustrated in FIG. 3.

The mounting plate 40 may be fabricated from a variety of materials using the concepts of the invention. The material from which the mounting plate 40 is fabricated should resist deformation while the universal belted chain 10 is being used as such deformation could lead to degradation of the mounting plate 40. One suitable material that may be used to fabricate the mounting plate 40 is steel.

The fastener 34 may have a variety of configurations. One important criterion is that the fastener 34 should resist inadvertent separation. An example of one suitable fastener is a rivet.

In certain types of belted chain, the spacing or pitch between adjacent rods 20 is between 20 millimeters and about 120 millimeters. In certain embodiments, the belt 22 is formed with apertures extending therethrough at a standard spacing such as about 20 millimeters between adjacent apertures. The rods 20 can be attached to the belt 22 at a desired spacing using only a portion of the apertures in the belt 22. While such an approach results in the formation of more apertures in the belt 22 than are needed, this approach does not notably decrease the overall strength of the belt 22.

Another approach is to form the belt 22 without apertures. When the belt 22 is desired to be used with rods 20 at a particular pitch, the apertures are formed in the belt 22 such as using a drill. This approach minimizes additional apertures being formed in the belt 22, which could potentially negatively impact the strength of the belt 22. As compared to the prior art where belts had to be manufactured for each pitch, this approach significantly reduces the inventory that needs to be stored.

Because the fastener 34 and the mounting plate 40 are recessed in the lower surface 30 of the belt 22, the universal belted chain 10 is suitable for use with a variety of belt drive mechanisms, examples of which include a sprocket that engages the rods, under belt cams, rods and cams and friction drive.

Depending on the width of the universal belted chain 10, there may be at least one intermediate belt (not shown) that is positioned between the belts 22. The at least one intermediate belt reduces the potential of the rods 20 deforming while the product is moved on the universal belted chain 10.

In addition to allowing the rods 20 to be attached to the belts 22 at different pitches, the universal belted chain 10 provides a high level of belt flexibility and a high level of belt strength as compared to prior art belted chain.

In the preceding detailed description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The preceding detailed description, therefore, is not to be taken in a limiting sense, and the scope of the present invention is defined by the appended claims.

It is contemplated that features disclosed in this application, as well as those described in the above applications incorporated by reference, can be mixed and matched to suit particular circumstances. Various other modifications and changes will be apparent to those of ordinary skill.

The invention claimed is:

1. A universal belted chain comprising:
    a first belt having a first upper surface, a first lower surface, a first side edge and a second side edge, wherein the first lower surface has a first channel formed therein that defines a lower surface portion along at least one of the first side edge and the second side edge;
    a second belt having a second upper surface, a second lower surface a first side edge and a second side edge, wherein the second lower surface has a second channel formed therein that defines a lower surface portion along at least one of the first side edge and the second side edge;
    a first rod;
    a first fastener that attaches the first rod to the first upper surface by extending the first fastener through the first belt, wherein an end of the first fastener opposite the first rod is recessed in the first channel with respect to the first lower surface; and
    a second fastener that attaches the first rod to the second upper surface by extending the second fastener through the second belt, wherein an end of the second fastener opposite the first rod is recessed in the second channel with respect to the second lower surface.

2. The universal belted chain of claim 1, and further comprising:
    a second rod;
    a third fastener that attaches the second rod to the first upper surface by extending the third fastener through the first belt, wherein an end of the third fastener opposite the second rod is recessed in the first channel with respect to the first lower surface; and
    a fourth fastener that attaches the second rod to the second upper surface by extending the fourth fastener through the second belt, wherein an end of the fourth fastener opposite the second rod is recessed in the second channel with respect to the second lower surface and wherein there is a first spacing between the first rod and the second rod.

3. The universal belted chain of claim 1, wherein the first belt has a plurality of first apertures formed therein that each intersect the first channel and wherein the second belt has a plurality of second apertures formed therein that each intersect the second channel.

4. The universal belted chain of claim 3, wherein a distance between adjacent apertures in the plurality of first apertures and the plurality of second apertures is approximately equal.

5. The universal belted chain of claim 1, wherein the lower surface portion on the first belt and the second belt comprises a first lower surface portion along the first side edge and a second lower surface portion along the second side edge and wherein the first channel is intermediate the first side edge and the second side edge so that the first lower surface portion and the second lower surface portion are on opposite sides of the first channel.

6. The universal belted chain of claim 1, and further comprising a mounting plate that is recessed in the first channel, wherein the first fastener extends through the mounting plate when the first rod is attached to the first belt.

7. The universal belted chain of claim 6, wherein the mounting plate has a length that is approximately equal to a width of the first channel.

8. The universal belted chain of claim 1, wherein the first rod has a first end and a second end that is opposite the first end, wherein the first end is attached to the first belt and wherein the second end is attached to the second belt.

9. The universal belted chain of claim 1, wherein the first fastener and the second fastener are each a rivet.

10. A universal belted chain comprising:
    a first belt having a first upper surface, a first lower surface, a first side edge and a second side edge, wherein the first lower surface has a first channel formed therein that defines a lower surface portion along at least one of the first side edge and the second side edge and wherein the first belt has a plurality of first apertures formed therein that each intersect the first channel;
    a second belt having a second upper surface, a second lower surface a first side edge and a second side edge, wherein the second lower surface has a second channel formed therein that defines a lower surface portion along at least one of the first side edge and the second side edge and wherein the second belt has a plurality of second apertures formed therein that each intersect the second channel;
a first rod;
a second rod;
a first fastener that attaches the first rod to the first upper surface by extending the first fastener through the first belt, wherein an end of the first fastener opposite the first rod is recessed in the first channel with respect to the first lower surface;
a second fastener that attaches the first rod to the second upper surface by extending the second fastener through the second belt, wherein an end of the second fastener opposite the first rod is recessed in the second channel with respect to the second lower surface;
a third fastener that attaches the second rod to the first upper surface by extending the third fastener through the first belt, wherein an end of the third fastener opposite the second rod is recessed in the first channel with respect to the first lower surface; and
a fourth fastener that attaches the second rod to the second upper surface by extending the fourth fastener through the second belt, wherein an end of the fourth fastener opposite the second rod is recessed in the second channel with respect to the second lower surface and wherein there is a first spacing between the first rod and the second rod.

11. The universal belted chain of claim 10, and further comprising a mounting plate that is recessed in the first channel, wherein the first fastener extends through the mounting plate when the first rod is attached to the first belt.

12. The universal belted chain of claim 10, wherein the first rod has a first end and a second end that is opposite the first end, wherein the first end is attached to the first belt and wherein the second end is attached to the second belt.

13. The universal belted chain of claim 10, wherein the first fastener, the second fastener, the third fastener and the fourth fastener are each a rivet.

14. A method of forming universal belted chain comprising:
providing a first belt having a first upper surface a first belt having a first upper surface, a first lower surface, a first side edge and a second side edge, wherein the first lower surface has a first channel formed therein that defines a lower surface portion along at least one of the first side edge and the second side edge;
providing a second belt having a second upper surface, a second lower surface a first side edge and a second side edge, wherein the second lower surface has a second channel formed therein that defines a lower surface portion along at least one of the first side edge and the second side edge;
attaching a first rod to the upper surface of the first belt by extending a first fastener through the first belt, wherein an end of the first fastener opposite the first rod is recessed in the first channel with respect to the first lower surface;
attaching the first rod to the upper surface of the second belt by extending a second fastener through the second belt, wherein an end of the second fastener opposite the first rod is recessed with respect in the second channel to the second lower surface.

15. The method of claim 14, and further comprising:
attaching a second rod to the first upper surface by extending a third fastener through the first belt, wherein an end of the third fastener opposite the second rod is recessed in the first channel with respect to the first lower surface; and
attaching the second rod to the second upper surface by extending a fourth fastener through the second belt, wherein an end of the fourth fastener opposite the second rod is recessed in the second channel with respect to the second lower surface and wherein there is a first spacing between the first rod and the second rod.

16. The method of claim 15, wherein the first belt has a plurality of first apertures formed therein that each intersect the first channel, wherein the second belt has a plurality of second apertures formed therein that each intersect the second channel and wherein the method further comprises:
detaching the second rod from the first belt and the second belt;
changing a distance between the first rod and the second rod from the first spacing to a second spacing; and
attaching the second rod to the first belt and the second belt with the third fastener and the fourth fastener.

17. The method of claim 16, wherein a distance between adjacent apertures in the plurality of first apertures and the plurality of second apertures is approximately equal.

18. The method of claim 14, wherein the lower surface portion on the first belt and the second belt comprises a first lower surface portion along the first side edge and a second lower surface portion along the second side edge and wherein the first channel is intermediate the first side edge and the second side edge so that the first lower surface portion and the second lower surface portion are on opposite sides of the first channel.

19. The method of claim 14, wherein the first rod has a first end and a second end that is opposite the first end, wherein the first end is attached to the first belt and wherein the second end is attached to the second belt.

20. The method of claim 14, wherein the first fastener and the second fastener do not contact a support as the universal belted chain moves over the support.

* * * * *